US012751524B2

(12) United States Patent
Torlay

(10) Patent No.: US 12,751,524 B2

(45) Date of Patent: Oct. 6, 2026

(54) RETAINING DEVICE FOR PROTECTING RETAINING ELEMENTS

(71) Applicant: APLIX, Le Cellier (FR)

(72) Inventor: Laurent Torlay, Le Cellier (FR)

(73) Assignee: APLIX, Le Cellier (FR)

(*) Notice: Subject to any disclaimer, the term of this patent is extended or adjusted under 35 U.S.C. 154(b) by 557 days.

(21) Appl. No.: 18/253,761

(22) PCT Filed: Nov. 22, 2021

(86) PCT No.: PCT/FR2021/052064

§ 371 (c)(1),
(2) Date: Oct. 31, 2023

(87) PCT Pub. No.: WO2022/106796

PCT Pub. Date: May 27, 2022

(65) Prior Publication Data

US 2025/0351925 A1 Nov. 20, 2025

(30) Foreign Application Priority Data

Nov. 23, 2020 (FR) ....................................... 2012004

(51) Int. Cl.
*A44B 18/00* (2006.01)
*B29C 44/12* (2006.01)

(52) U.S. Cl.
CPC ...... *A44B 18/0076* (2013.01); *B29C 44/1261* (2013.01); *B29C 44/1271* (2013.01)

(58) Field of Classification Search
CPC ............ A44B 18/0076; B29C 44/1261; B29C 44/1271
USPC ............................................................ 156/60
See application file for complete search history.

(56) References Cited

U.S. PATENT DOCUMENTS

2002/0164449 A1* 11/2002 Fujisawa ................. B29C 48/05 264/239
2005/0268439 A1 12/2005 Poulakis

FOREIGN PATENT DOCUMENTS

| | | | |
|---|---|---|---|
| EP | 0604869 | A1 | 7/1994 |
| EP | 1661477 | A1 | 5/2006 |
| FR | 2609758 | A1 | 7/1988 |
| KR | 101744495 | B1 | 6/2017 |
| WO | 9805232 | A1 | 2/1998 |
| WO | 2011100999 | A1 | 8/2011 |

(Continued)

OTHER PUBLICATIONS

Ogawa, K., et al.,"English machine-translation by Clarivate Analytics of FR2609758A1 with full FR patent application included", A44B18/0076, Jul. 22, 1988. (Year: 1988).*

(Continued)

*Primary Examiner* — Abbas Rashid
*Assistant Examiner* — Gregory C. Grosso
(74) *Attorney, Agent, or Firm* — Bookoff McAndrews, PLLC

(57) ABSTRACT

Retaining device, comprising a tape having an upper face extending along a longitudinal direction, the upper face being provided with retaining elements, characterized in that the upper face of the tape comprises at least one seam of material defining a contour having an internal surface comprising retaining elements, each of the at least one seam having two ends, the ends being associated in pairs, the distance between the ends of each pair of ends being less than or equal to 1 mm.

18 Claims, 10 Drawing Sheets

(56) References Cited

FOREIGN PATENT DOCUMENTS

| | | | |
|---|---|---|---|
| WO | 2017187096 | A1 | 11/2017 |
| WO | 2018007338 | A1 | 1/2018 |

OTHER PUBLICATIONS

Chung N., "English machine-translation by Clarivate Analytics of (KR101744495B1) with full KR patent application included", A44B18/00, Jan. 4, 2016. (Year: 2016).*

Ogawa, K., et al.,"English machine-translation by Clarivate Analytics of FR2609758A1 with full FR patent application included", A44B18/0076, Jul. 22, 1988. (See NPL Document Filed on Sep. 17, 2025.) (Year: 1988).*

Chung N., "English machine-translation by Clarivate Analytics of (KR101744495B1) with full KR patent application included", A44B18/00, Jan. 4, 2016. (See NPL Document Filed on Sep. 17, 2025.) (Year: 2016).*

French Search Report issued in French Application No. 2012004, mailed Jul. 30, 2021.

International Search Report and Written Opinion issued in International Application No. PCT/FR2021/052064, mailed Mar. 3, 2022.

* cited by examiner

RETAINING DEVICE FOR PROTECTING RETAINING ELEMENTS

This is a National Stage Application under 35 U.S.C. § 371 of International Application No. PCT/FR2021/052064, filed Nov. 22, 2021, now published as WO 2022/106796 A1, which claims priority to French Patent Application No. 2012004, filed on Nov. 23, 2020.

TECHNICAL FIELD

This disclosure relates to the field of hook-and-loop type retaining systems, in particular for fixing trims to a foam.

PRIOR ART

Hook-and-loop type retaining systems are commonly used for fixing foam trims, for example for vehicle seats or coatings.

A recurring problem relates to the integration and protection of retaining elements in the trims. Indeed, the injection of foam tends to cover the retaining elements thus making them inoperative. Various methods have been proposed in order to protect the retaining elements. However, these different methods entail significant constraints during manufacture and/or limits as to the shapes of strips of retaining elements that can thus be produced.

Document WO98/05232 thus has an example of a trim fixing device and the associated manufacturing method. In this document, a coating is positioned on a tape provided with hooks; this coating is then cut and partially removed in order to form a single continuous contour around an area of hooks. Such a method is however technically constraining.

This disclosure aims at overcoming at least partially these problems.

DISCLOSURE OF THE INVENTION

In order to at least partially overcome the aforementioned problems, the present disclosure relates to a retaining device comprising a tape having an upper face extending along a longitudinal direction, said upper face being provided with retaining elements, characterized in that the upper face of the tape comprises at least one seam of material defining a contour having an internal surface comprising retaining elements, each of said at least one seam having two ends, said ends being associated in pairs, the distance between the ends of each pair of ends being less than or equal to 1 mm.

According to one example, the upper face of the tape comprises at least two seams of material defining a contour, each of said at least two seams having two ends, said ends being associated in pairs, the distance between the ends of each pair of ends being less or equal to 1 mm.

The device may typically comprise a metallic element extending along the longitudinal direction, between two seams.

According to one example, the retaining elements are disposed in several columns extending along the longitudinal direction, and in that each of the seams extends along a path having at all points a component along the longitudinal direction that is non-zero.

According to one example, said seams are superimposed at least at one point in a vertical direction, perpendicular to the upper face of the tape.

According to one example, said seams are tangent at least at one point.

According to one example, each of said at least one seams has a width comprised between 0.3 mm and 10 mm, in particular between 0.5 mm and 10 mm, in another case a width comprised between 0.4 and 5 mm.

According to one example, at least one, preferably each of said retaining elements, more particularly arranged in the contour, have a maximum dimension "La" measured in a transverse direction perpendicular to the longitudinal direction and parallel to the upper face of the tape, and wherein each of said at least one seam has a width comprised between 0.2*La and 10*La, for example between 0.5*La and 10*La.

According to one example, said retaining elements, preferably arranged in the contour, have a height Ha measured in a vertical direction, perpendicular to the upper face of the tape, and wherein each of said at least one seam has a thickness measured in the vertical direction strictly greater than Ha.

According to one example, each of said seams comprises in its formulation at least one elastomeric material.

According to one example, the seam comprises several portions, for example a lower portion arranged to allow fixing with the tape, in particular the base of the tape, and an upper portion arranged at the free end of the lower portion. For example, the lower portion and the upper portion have a material density difference of at least 0.2, in particular of at least 0.4. For example, the lower portion comprises in its formulation at least one elastomeric material and the upper portion comprises a material with a density lower than 0.2.

According to one example, the density of the material of the seam is greater than 0.2, or even greater than 0.5.

According to one example, each of said seams is made of an elastomeric material and/or an elastomeric thermoplastic.

According to one example, the seams are formed so as to at least partially envelop retaining elements.

According to one example, said seam(s) result from extrusions.

According to one example, the tape comprises a base, for example resulting from injection and/or extrusion, which is formed integrally with the retaining elements.

According to one example, the base is a woven fabric which comprises a ground yarn and a warp yarn interwoven with each other. A retaining device as proposed comprising a seam thus allows to define a good compromise of flexibility of the retaining device to allow its easy positioning before the foaming operation without the latter being too rigid and therefore felt by the user of a seat incorporating the retaining device.

According to one example, the base of the tape is a woven fabric comprising a ground yarn and a warp yarn interwoven with each other, and the retaining elements are formed by yarns arranged at least partly in the base.

According to one example, the yarns forming the retaining elements are monofilament yarns. According to one example, the yarns forming the retaining elements are arranged in the base in the shape of a "V" and/or a "W" including a head at their two free ends.

According to one example, the seams are formed of a material that is non-porous and/or devoid of open and/or closed cells.

According to one example, the tape comprises retaining elements arranged outside the contour and outside the at least one seam to allow better mechanical anchoring of the tape in the foam.

According to one example, the tape comprises retaining elements arranged outside the contour and outside the at least one seam so as to allow better mechanical anchoring of the tape in the foam. These retaining elements forming an anchor are for example arranged in particular in the corners of the retaining device and/or these retaining elements forming an anchor define at least two distinct anchoring areas, in particular two opposite anchoring areas. These retaining elements forming an anchor of the retaining device typically define at least X distinct anchoring areas, with X an even integer comprised between 4 and 100, the X anchoring areas being in particular opposite one another and/or regularly distributed in the periphery of the contour and/or being arranged symmetrically with respect to a center line of the retaining device (said center line extending substantially along the longitudinal direction and being equidistant from the side edges of the retaining device).

According to one example, the base of the tape has a thickness “E” typically comprised between 0.2 mm and 1 mm, in particular comprised between 0.3 mm and 0.7 mm.

According to one example, the retaining device comprises means for anchoring in the foam attached to the face of the base of the tape opposite to that comprising the retaining elements.

According to one example, the means for anchoring in the foam is formed of loops, for example of a knit comprising loops, and optionally a support film, the means for anchoring in the foam being fixed on the face of the base of the tape opposite to that comprising the retaining elements, for example with an adhesive, for example an adhesive comprising magnetic particles.

According to one example, the seams are arranged outside walls and/or ribs formed on the tape and/or on the base of the tape.

According to one example, each seam is continuous, and formed from the same material.

According to one example, each contour is bordered by at least one seam, and the perimeter of the contour is typically comprised between 30 mm and 2050 mm.

According to one example, the ratio of the perimeter of the contour to the width of the seam is greater than 3, in particular greater than 10, in particular greater than 30 and/or less than 8000, in particular less than 7000, in particular less than 4000.

According to one example, each retaining element comprises a rod and a head, the retaining elements are adapted to cooperate with a counterpart comprising loops to produce a hook-and-loop closure of the “Male-Female” type.

According to one example, each retaining element comprises a rod and a head, the retaining elements are adapted to cooperate with a counterpart comprising retaining elements each comprises a rod and a head to produce a hook-and-loop closure of the “Male-Male” type.

According to one example, each retaining element forms at least one loop, the retaining elements are adapted to cooperate with a counterpart comprising retaining elements each comprises a rod and a head to produce a hook-and-loop closure of the “Female-Male” type.

This disclosure also relates to a method for manufacturing a retaining device wherein:

- provision is made of a tape having an upper face extending along a longitudinal direction, said upper face being provided with retaining elements,
- at least one seam of material is formed on the upper face of the tape by deposition of material, so as to define a contour, each of said at least one seam having two ends, said ends being associated in pairs, the distance between the ends of each end pair being less than or equal to 1 mm.

According to one example, at least two seams of material are formed by depositing material on the upper face of the tape, each of said at least two seams having two ends, said ends being associated in pairs, the distance between the ends of each end pair being less than or equal to 1 mm.

According to one example, the tape is provided with a metallic element extending along the longitudinal direction, and wherein the seams are formed in pairs, each pair being on either side of a metallic element.

According to one example, the deposition of material is carried out by injection nozzles, depositing material on the upper face of the tape, said tape being moved in the longitudinal direction.

According to one example, said seams of material are superimposed at least at one point in a vertical direction, perpendicular to the upper face of the tape.

According to one example, said seams of material are tangent at least at one point.

According to one example, each of said at least one seam has a width comprised between 0.3 mm and 10 mm, in particular between 0.5 mm and 10 mm, in another case a width comprised between 0.4 and 5 mm.

According to one example, said retaining elements, preferably arranged in the contour, have a maximum dimension “La” measured in a transverse direction perpendicular to the longitudinal direction and parallel to the upper face of the tape, and wherein each of said at least one seam has a width comprised between 0.5*La and 10*La.

According to one example, said retaining elements, preferably arranged in the contour, have a height “Ha” measured in a vertical direction, perpendicular to the upper face of the tape, and wherein each of said at least one seam has a thickness measured in a vertical direction, perpendicular to the upper face of the tape strictly greater than Ha.

According to one example, each of said seams comprises in its formulation at least one elastomeric material.

According to one example, the seam comprises several portions, for example a lower portion arranged to allow fixing with the tape, in particular the base of the tape, and an upper portion arranged at the free end of the lower portion. For example, the lower portion and the upper portion have a material density difference of at least 0.2, in particular of at least 0.4. For example, the lower portion comprises in its formulation at least one elastomeric material and the upper portion comprises a material with a density lower than 0.2.

According to one example, the density of the material of the seam is greater than 0.2, or even greater than 0.5.

According to one example, each of said seams is made of an elastomeric material and/or an elastomeric thermoplastic.

According to one example, the seams are formed so as to at least partially envelop retaining elements.

According to one example, said seam(s) result from extrusions.

According to one example, the tape comprises a base, for example resulting from injection and/or extrusion, which is formed integrally with the retaining elements.

According to one example, the base is a woven fabric which comprises a ground yarn and a warp yarn interwoven with each other. A retaining device as proposed comprising a seam thus allows to define a good compromise of flexibility of the retaining device to allow its easy positioning before the foaming operation without the latter being too rigid and therefore felt by the user of a seat incorporating the retaining device.

According to one example, the base of the tape is a woven fabric comprising a ground yarn and a warp yarn interwoven with each other, and the retaining elements are formed by yarns arranged at least partly in the base.

According to one example, the yarns forming the retaining elements are monofilament yarns. According to one example, the yarns forming the retaining elements are arranged in the base in the shape of a "V" and/or a "W" including a head at their two free ends.

According to one example, the seams are formed of a material that is non-porous and/or devoid of open and/or closed cells.

According to one example, the tape comprises retaining elements arranged outside the contour and outside the at least one seam to allow better mechanical anchoring of the tape in the foam.

According to one example, the tape comprises retaining elements arranged outside the contour and outside the at least one seam so as to allow better mechanical anchoring of the tape in the foam. These retaining elements forming an anchor are for example arranged in particular in the corners of the retaining device and/or these retaining elements forming an anchor define at least two distinct anchoring areas, in particular two opposite anchoring areas. These retaining elements forming an anchor of the retaining device typically define at least X distinct anchoring areas, with X an even integer comprised between 4 and 100, the X anchoring areas being in particular opposite one another and/or regularly distributed in the periphery of the contour and/or being arranged symmetrically with respect to a center line of the retaining device (said center line extending substantially along the longitudinal direction and being equidistant from the side edges of the retaining device).

According to one example, the base of the tape has a thickness "E" typically comprised between 0.2 mm and 1 mm, in particular comprised between 0.3 mm and 0.7 mm.

According to one example, the retaining device comprises means for anchoring in the foam attached to the face of the base of the tape opposite to that comprising the retaining elements.

According to one example, the means for anchoring in the foam is formed of loops, for example of a knit comprising loops, and optionally a support film, the means for anchoring in the foam being fixed on the face of the base of the tape opposite to that comprising the retaining elements, for example with an adhesive, for example an adhesive comprising magnetic particles.

According to one example, the seams are arranged outside walls and/or ribs formed on the tape and/or on the base of the tape.

According to one example, each seam is continuous, and formed from the same material.

According to one example, each contour is bordered by at least one seam, and the perimeter of the contour is typically comprised between 30 mm and 2050 mm.

According to one example, the ratio of the perimeter of the contour to the width of the seam is greater than 3, in particular greater than 10, in particular greater than 30 and/or less than 8000, in particular less than 7000, in particular less than 4000.

According to one example, each retaining element comprises a rod and a head, the retaining elements are adapted to cooperate with a counterpart comprising loops to produce a hook-and-loop closure of the "Male-Female" type.

According to one example, each retaining element comprises a rod and a head, the retaining elements are adapted to cooperate with a counterpart comprising retaining elements each comprises a rod and a head to produce a hook-and-loop closure of the "Male-Male" type.

According to one example, each retaining element forms at least one loop, the retaining elements are adapted to cooperate with a counterpart comprising retaining elements each comprises a rod and a head to produce a hook-and-loop closure of the "Female-Male" type.

According to one example, following the production of the seams of material, the tape is cut around each contour defined by the seams of material.

This disclosure also relates to a seat, for example a car seat, comprising

- a foam object,
- a cap intended to cover at least part of the foam object, and
- a retaining device as defined previously,
- wherein the retaining device is arranged in the foam object to allow at least one attachment to be made between the foam object and the cap.

According to one example, the retaining device is integral with the foam object.

BRIEF DESCRIPTION OF THE DRAWINGS

The invention and its advantages will be better understood upon reading the detailed description given below of various embodiments of the invention given by way of non-limiting examples.

In all the figures, the elements in common are identified by identical reference numerals.

DESCRIPTION OF EMBODIMENTS

Figure 1:
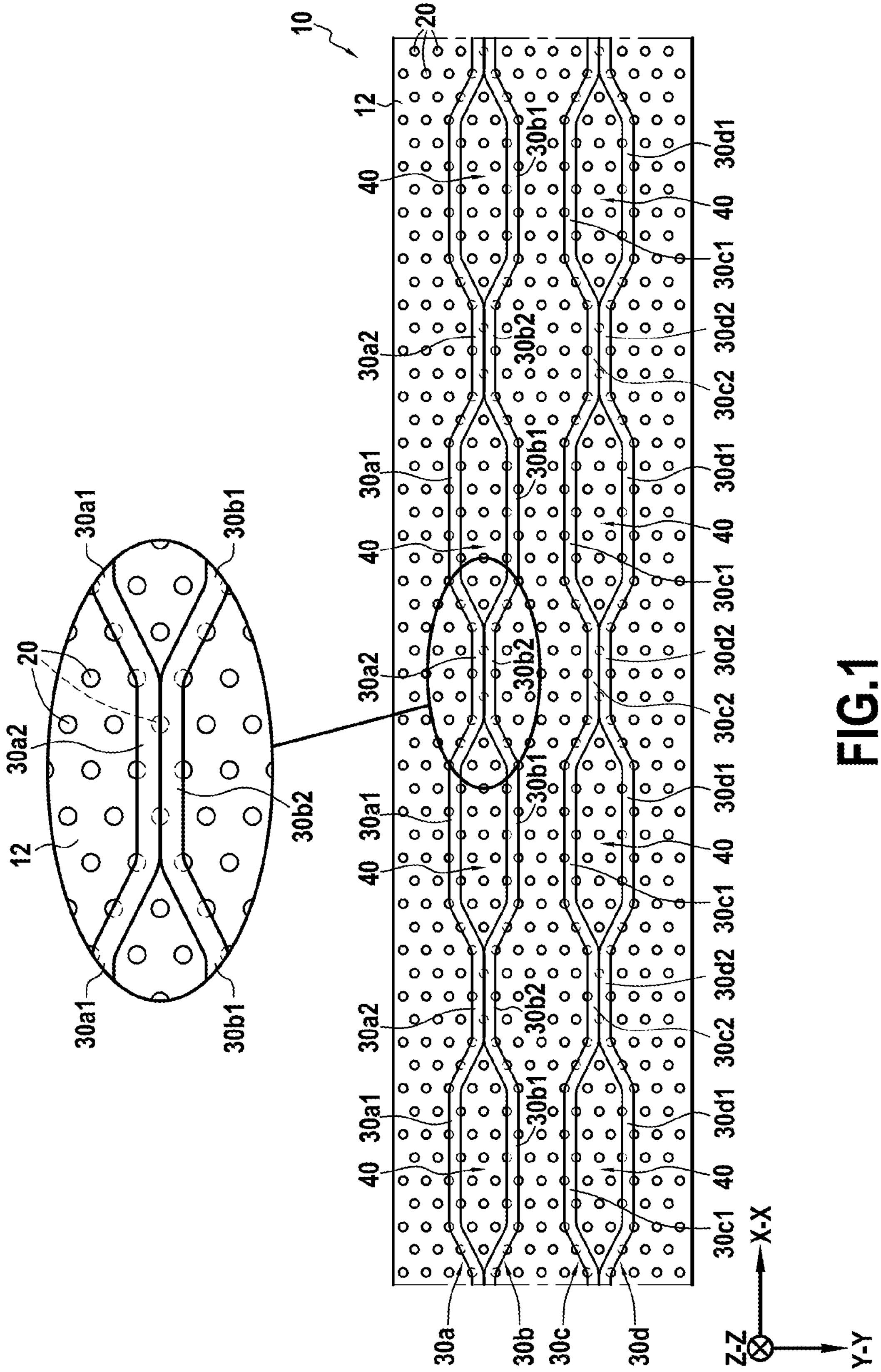
FIG. 1 schematically shows an example of a device according to one aspect of the invention.

FIG. 1 shows an example of a retaining device according to one aspect of the invention.

The device as proposed comprises a tape 10 having a substantially planar upper face 12. The tape 10 extends along a longitudinal direction X-X. A transverse direction Y-Y is defined, perpendicular to the longitudinal direction X-X, and extending in a plane defined by the upper face 12 of the tape 10. A vertical direction Z-Z is also defined, perpendicular to the plane defined by the longitudinal direction X-X and by the transverse direction Y-Y, that is to say perpendicular to the upper face 12 of the tape 10. The tape typically comprises weft yarns and warp yarns forming a woven fabric.

The upper face 12 of the tape 10 is provided with retaining elements 20. They may for example be hooks adapted to cooperate with other hooks or with loops in order to produce a hook-and-loop type connection. The tape 10 may have a base, for example resulting from injection and/or extrusion, which may be formed integrally with the retaining elements 20.

The retaining elements 20 are typically arranged so as to form lines extending along the longitudinal direction, the spacing between two successive retaining elements 20 in the longitudinal direction defining the pitch in the longitudinal direction. The different rows of retaining elements are typically arranged either so that the retaining elements define rows in the transverse direction Y-Y, or staggered, that is to say so that two successive rows are offset by half the pitch in the longitudinal direction.

The device comprises seams 30 formed on the upper face 12 of the tape 10.

The seams 30 are formed by depositing material on the upper face 12 of the tape 10, for example as will be described later. The seams 30 typically result from extrusion. The seams are typically formed of a material that is non-porous and/or devoid of open and/or closed cells.

In the example illustrated in FIG. 1, 4 seams 30 were shown, said seams are formed on the upper face 12 of the tape 10, which will be designated respectively by 30*a*, 30*b*, 30*c* and 30*d*, or more generally by adding the index a, b, c or d to designate the concerned seam or part of it.

In the example illustrated, the seams 30 are arranged in pairs, each pair defining one or more contours. As visible in FIG. 1, the seams 30*a* and 30*b* are here symmetrical or substantially symmetrical, and have a nonlinear profile in the longitudinal direction. Profile means the trajectory of the seam 30 considered on the upper face 12 of the tape 10, typically the projection on the plane defined by the longitudinal direction X-X and the transverse direction Z-Z of a curve passing through the center of the sections of the considered seam 30.

Thus, the seams 30*a* and 30*b* have portions 30*a*1 and 30*b*1 separate and distant from each other, and portions 30*a*2 and 30*b*2 at which the seams 30*a* and 30*b* are in contact. Thus, two successive portions 30*a*2 define a contour 40, each contour 40 having an internal surface wherein are disposed retaining elements 20. Contour here defines a contour delimited by one or more seams 30, so that the ends of said seams defining the considered contour are not spaced apart by more than 1 mm, the spacing being for example measured in a direction parallel to the upper face 12 of the tape 10.

The various contours 40 typically have a maximum dimension measured in the plane defined by the upper face 12 of the tape 10 comprised between 0 mm and 50 mm, or between 0 mm and 30 mm.

The contour 40 (excluding the dimension of the seam) comprises at least one length extending along a longitudinal direction X-X and at least one width extending along the transverse direction Y-Y. The contour 40 comprises at least two different widths, which are preferably non-zero and/or the contour 40 comprises at least two different lengths, which are preferably non-zero. The contour 40 has a central portion and two longitudinal ends whose width in the central portion is greater than at least one of the widths in at least one of the longitudinal ends.

Each contour 40 being bordered by at least one seam 30, the perimeter of the contour 40 is typically comprised between 30 mm and 2050 mm.

The ratio of the perimeter of the contour 40 to the width of the seam 30 is typically greater than 3, in particular greater than 10, in particular greater than 30 and/or less than 8000, in particular less than 7000, in particular less than 4000.

The seams 30*c* and 30*d* have a profile similar to the seam 30*a* and 30*b* respectively.

In the example illustrated, the portions 30*a*2 and 30*b*2 are tangent in the longitudinal direction X-X, without overlapping of the seams 30*a* and 30*b*, that is to say that the seams 30*a* and 30*b* are not superimposed in the vertical direction Z-Z.

The seams 30 form sealing means around each contour 40. More specifically, when the upper face 12 of the tape 10 as shown is positioned resting against a flat surface, the seams 30 allow to isolate the different contours 40. Thus, it is possible to inject material, for example foam, around the various contours 40, while preventing the injected material from penetrating into the various contours 40, which thus allows to protect the retaining elements 10 arranged in the contours and prevent them from being covered with material, which could make them non-functional. It is noted here that the contours are not necessarily strictly closed. The ends of the seams can be contiguous or not contiguous. A maximum spacing of 1 mm can exist between two ends of the same seam or of several seams defining the considered contour 40. The maximum spacing "e" is measured from the end of one of the seams, and is the minimum distance separating the end in question from the other associated end or from a portion located nearby (typically less than 5 mm) from the other associated end. Such a contour can be described as closed, insofar as it has been observed that such a spacing of less than or equal to 1 mm is sufficient to produce a seal effect preventing the penetration of material such as foam into the contour 40.

The seams 30 are typically formed so as to completely or partially envelop retaining elements. The retaining elements 20 which are covered by the seams 30 are shown in dotted lines. The seams 30 are typically arranged outside walls or ribs formed on the tape 10 and/or on the base of the tape 10.

For each seam 30, one defines a length, which is its largest dimension, a thickness, which is its maximum dimension in the vertical direction Z-Z, and a width, which is its maximum dimension in a direction perpendicular to its length and to its height.

Thus, if it is considered that the retaining elements 20 have a maximum dimension "La" measured in a direction perpendicular to the longitudinal direction and parallel to the upper face of the tape, the seams 30 have a width comprised between 0.5*La and 10*La, in particular between 0.5*La and 3*La.

According to one example, each of said at least one seam has a width comprised between 0.3 mm and 10 mm, or else between 0.5 mm and 10 mm, or in particular comprised between 0.4 mm and 5 mm.

If it is considered that the retaining elements 20 have a height Ha measured in a direction perpendicular to the upper face of the tape, the seams 30 have a thickness measured in a direction perpendicular to the upper face of the tape comprised between 0.98 Ha and 2 Ha, typically strictly greater than 1.00 Ha, typically comprised between Ha and 1.5 Ha, or else between 1.01 Ha and 1.5 Ha.

Figure 12:
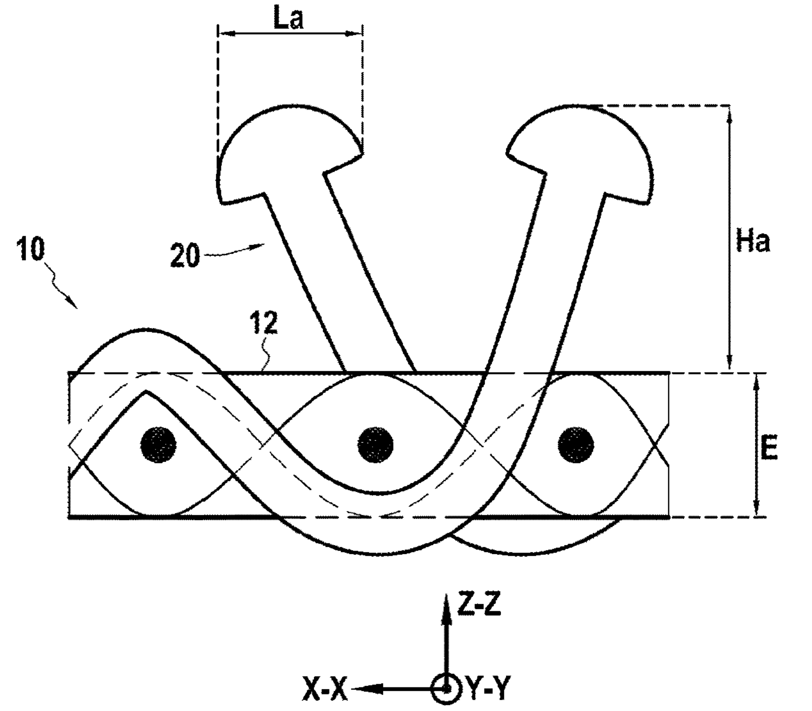
FIG. 12 schematically shows in sectional view of FIG. 11B an example of a retaining element.

Shown in FIG. 12 is an example of the shape of retaining elements 20, here commonly referred to as "mushroom", comprising a rod having a generally cylindrical shape of revolution, surmounted by a head having the shape of a portion of sphere. This figure shows the maximum dimension La, the height Ha, and a thickness E of the tape 10. It is clearly understood that this embodiment is not limiting, and that the retaining elements may have another shape, for example a shape commonly referred to as "four-lobed" comprising a rod having a section, in a plane perpendicular to the direction of extension of the rod, in the shape of a "+" or a "cross", surmounted by a head having four attachment portions and/or for example a shape commonly referred to as "three-lobed" comprising a rod having a section, in a plane perpendicular to the direction of extension of the rod, in the shape of "Y" or "Y" with branches of the same length, the branches being separated in pairs by an angle between 100° and 140°, surmounted by a head having three attachment portions or else on the same principle, for example commonly referred to as "five-lobed". The thickness E of the tape 10 is typically comprised between 0.2 mm and 1 mm, or for example between 0.3 mm and 0.7 mm.

The retaining elements 20 can also be in the form of loops, adapted to cooperate with a counterpart comprising retaining elements each comprises a rod and a head to produce a hook-and-loop closure of the "Female-Male" type.

In the example illustrated in FIG. 1, the different pairs of seams are, in certain areas (known as spacing areas), spaced apart from each other. Thus, the seams 30*a* and 30*b* are not in contact with the seams 30*c* and 30*d*. Such a configuration allows to define sets of contours 40 spaced apart from each other, which thus allows to cut strips comprising several aligned contours 40 having widened edges, which allows to facilitate anchoring, for example in the foam. As a variant embodiment, it could be considered that the spacing between the seams be smaller or larger depending in particular on the application.

According to one example, the pairs of seams are spaced apart in the spacing areas, by at least 10 mm, or by at least 5 mm, typically in the transverse direction Y-Y.

The pairs of seams are for example spaced apart, in the spacing areas, by a maximum distance of 400 mm, or 200 mm, or else 100 mm, typically in the transverse direction Y-Y.

The seams 30 are typically made by extrusion, and can be made of an elastomeric material and/or an elastomeric thermoplastic, or each seam 30 typically comprises at least an elastomeric material and/or an elastomeric thermoplastic in its formulation. The density of the material of each seam 30 is typically greater than 0.2, or else than 0.5.

Each seam 30 is typically contiguous, and formed from the same material. The seams 30 forming a pair of seams can be made of different materials, for example materials having different chemical resistances.

According to one example, the seams 30 may have several portions, for example a lower portion arranged to allow fixing with the tape, in particular the base of the tape, and an upper portion arranged at the free end of the lower portion. For example, the lower portion and the upper portion have a material density difference of at least 0.2, in particular of at least 0.4. For example, the lower portion comprises in its formulation at least one elastomeric material and the upper portion comprises a material with a density lower than 0.2.

The materials of the various seams 30 may have different colors, in particular in order to facilitate positioning in an injection mold or the cutting of patterns.

The device according to the invention advantageously comprises an optimized maximized surface of available retaining elements 20 whose contour has a complex shape.

The tape 10 typically comprises retaining elements 20 arranged outside the contour 40 and outside the at least one seam 30 to allow better mechanical anchoring of the tape 10 in the foam.

Figure 2:
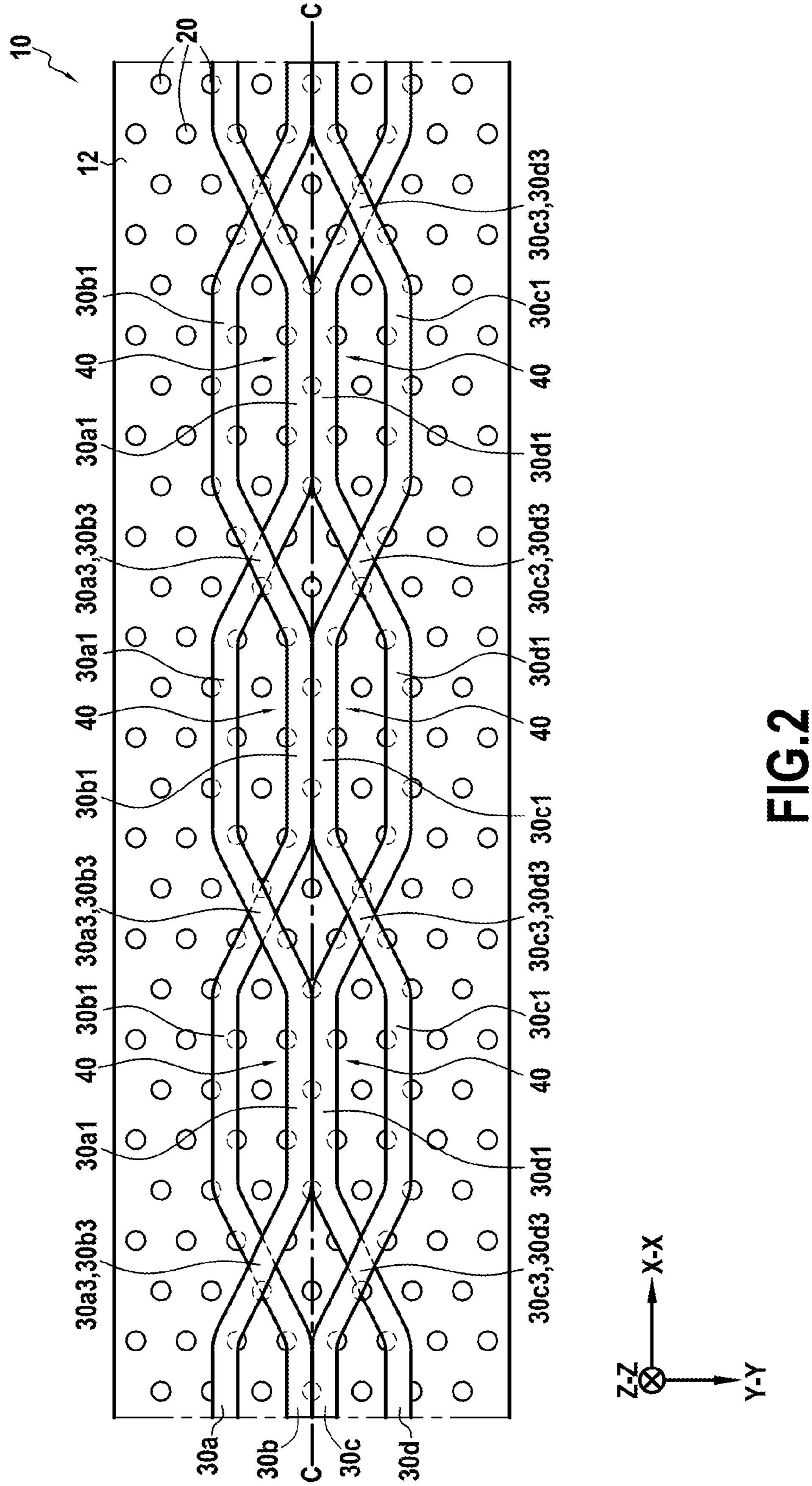
FIG. 2 schematically shows another example of a device according to one aspect of the invention.

FIG. 2 shows a variant of the example illustrated in FIG. 1.

This variant is similar to that already shown in FIG. 1. The difference lies in the trajectory of the seams 30. In this embodiment, it can be seen that the seams are arranged in pairs as in the embodiment described above, but that the seams of each pair overlap in given areas.

More specifically, in this embodiment, the seams 30 of each pair have at least two areas for which the two seams are superimposed, that is to say one above the other in the vertical direction Z-Z. 30*a*3 and 30*b*3 denote the overlapping portions of the seams 30*a* and 30*b*.

The seams 30 of each pair of seams thus have profiles that are symmetrical with respect to a central axis but offset by the length of a contour 40 in the longitudinal direction X-X. The seams 30 of each pair intersect, here at regular intervals, each interval corresponding to the length of a contour 40 in the longitudinal direction X-X.

Moreover, in the embodiment shown in FIG. 2, the seams 30 of the different pairs of seams are tangent. It can indeed be seen in FIG. 2 that the portions 30*a*1 and 30*d*1 of the seams 30*a* and 30*d* are tangent over part of the profile of the seams 30*a* and 30*d*, and that the portions 30*b*1 and 30*c*1 are tangent over part of the profile of the seams 30*b* and 30*c*. Such a configuration allows to improve the compactness of the device and thus to reduce the amount of product waste at the end of the cutting step of the latter. As an example, a cutting line CC is shown in FIG. 2.

Figure 3:
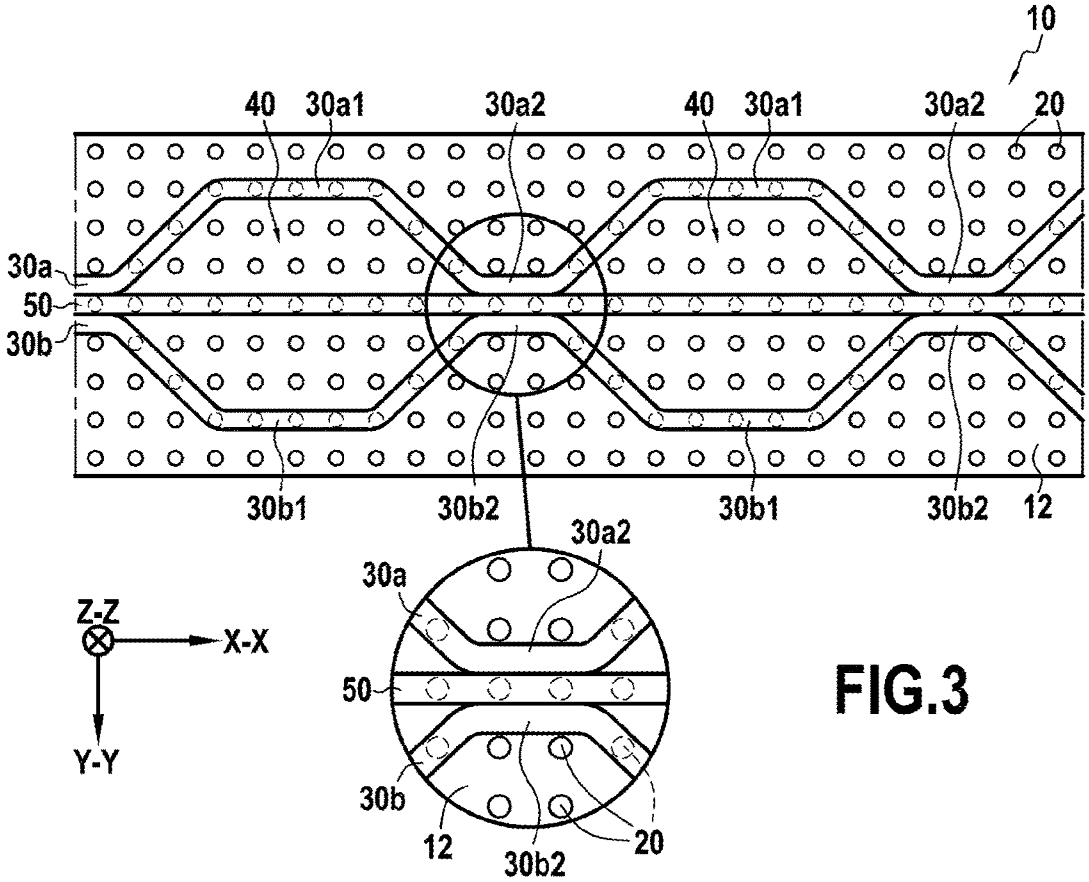
FIG. 3 schematically shows another example of a device according to one aspect of the invention.

FIG. 3 shows another example of a variant of the embodiments shown in FIGS. 1 and 2. In this example, the seams 30*a* and 30*b* form a pair of seams 30 not overlapping, as already described with reference to FIG. 1.

The differences with respect to the embodiment already described in FIG. 1 are described below.

In this embodiment, a metallic element, for example a metal rod 50 or a seam made of metallic material, is positioned between the seams 30*a* and 30*b*. The metallic element 50 is typically positioned so as to define a median axis between the seams 30*a* and 30*b*. The metallic element 50 typically extends along the longitudinal direction Z-Z. The portions 30*a*2 and 30*b*2 of the seams 30*a* and 30*b* thus contact the metallic element 50, on either side of the metallic element 50, without overlapping. Alternatively, the seams 30*a* and 30*b* may have an overlap as already described with reference to FIG. 2, the overlap then being typically made at the metallic element 50.

The metallic element 50 thus allows to increase even more than the at least one seam 30, the rigidity of a strip cut from the tape 20.

Figure 4:
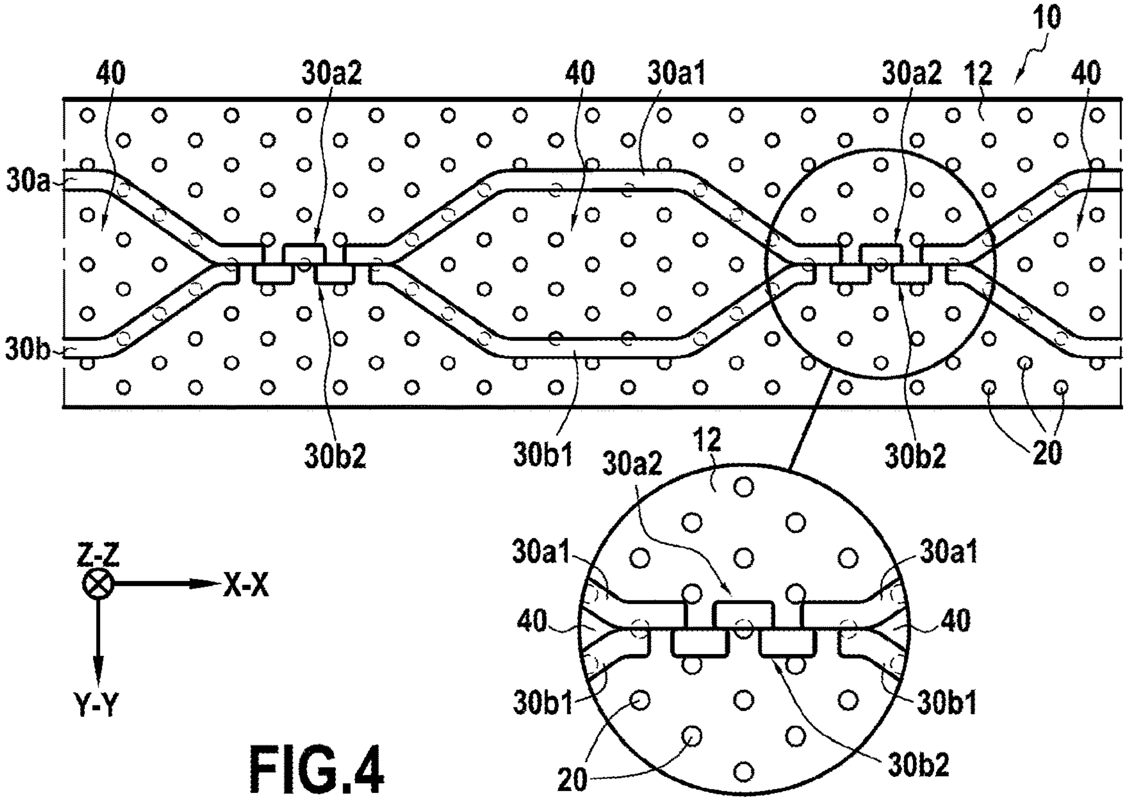
FIG. 4 schematically shows another example of a device according to one aspect of the invention.

FIG. 4 shows another example of a variant of the embodiment already shown in FIG. 1.

In this embodiment, the seams 30*a* and 30*b* here have a discontinuous layout. More specifically, in the example illustrated, the seams 30*a* and 30*b* are discontinuous at their portions 30*a*2 and 30*b*2 respectively. These discontinuous portions 30*a*2 and 30*b*2 are typically made so that the projections of the discontinuous portions in the longitudinal direction X-X have a zero intersection. In other words, considering the portions 30*a*2 and 30*b*2 of the pair of seams 30*a* and 30*b*, if the successive sections of these portions are taken in the longitudinal direction, for each section, at least one of the two seams does not have a discontinuous section. Therefore, this allows to ensure that the portions 30*a*2 and

30*b*2 of the pair of seams 30*a* and 30*b* form a barrier over the entire length of the portions 30*a*2 and 30*b*2 of the pair of seams 30*a* and 30*b*.

Such an embodiment allows in particular to reduce the amount of material required, and the total weight of the seams 30, in particular in an area outside a contour or else between two contours.

Figure 5:
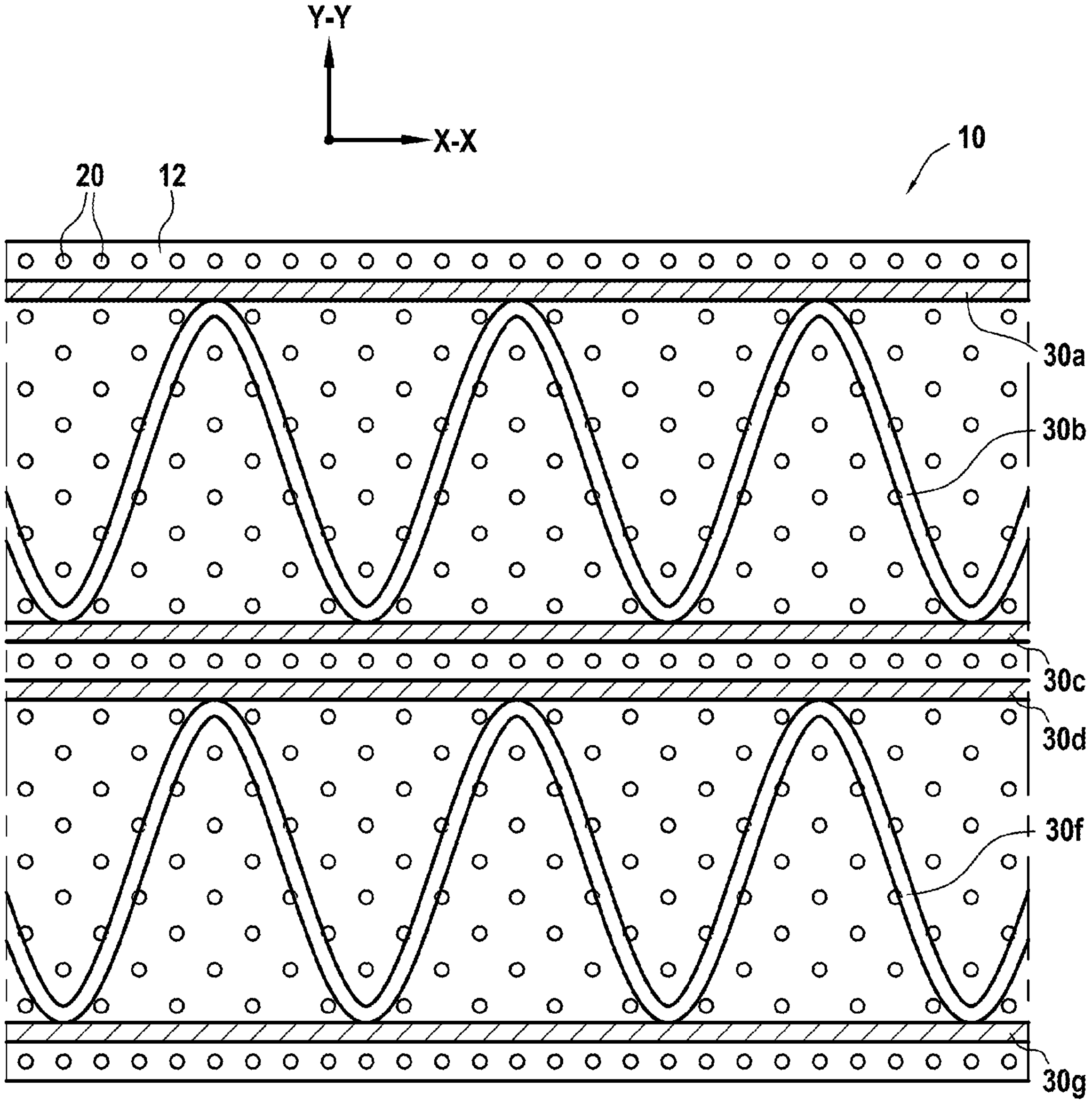
FIG. 5 schematically shows another example of a device according to one aspect of the invention.

FIG. 5 shows another embodiment according to one aspect of the invention.

In this embodiment, a distinction is made between linear or substantially linear seams extending along the longitudinal direction X-X, and wavy seams having, for example, a sinusoidal-type layout between two linear seams.

The example illustrated shows a tape 10 comprising 4 linear seams 30*a*, 30*c*, 30*d* and 30*f*, as well as two wavy seams 30*b* and 30*f*.

The corrugated seams 30*b* and 30*f* contact the linear seams or at a distance less than or equal to 1 mm from the linear seams at the different peaks of the undulations. Thus, in this example, two subsets can be defined; a first subset formed by the seams 30*a*, 30*b* and 30*c*, and a second subset formed by the seams 30*d*, 30*f* and 30*g*, these two subsets being separated by a strip which can typically comprise one or more rows of retaining elements. The tape 10 can for example be cut along the longitudinal direction X-X between the seams 30*c* and 30*d* in order to obtain two separate products, and if necessary near the seams 30*a* and 30*g*. In these two subsets, the ends of the corrugated seam are associated in pairs with the linear seams, to define sectors of retaining elements which are protected during the injection of material on the tape 10.

Figure 6:
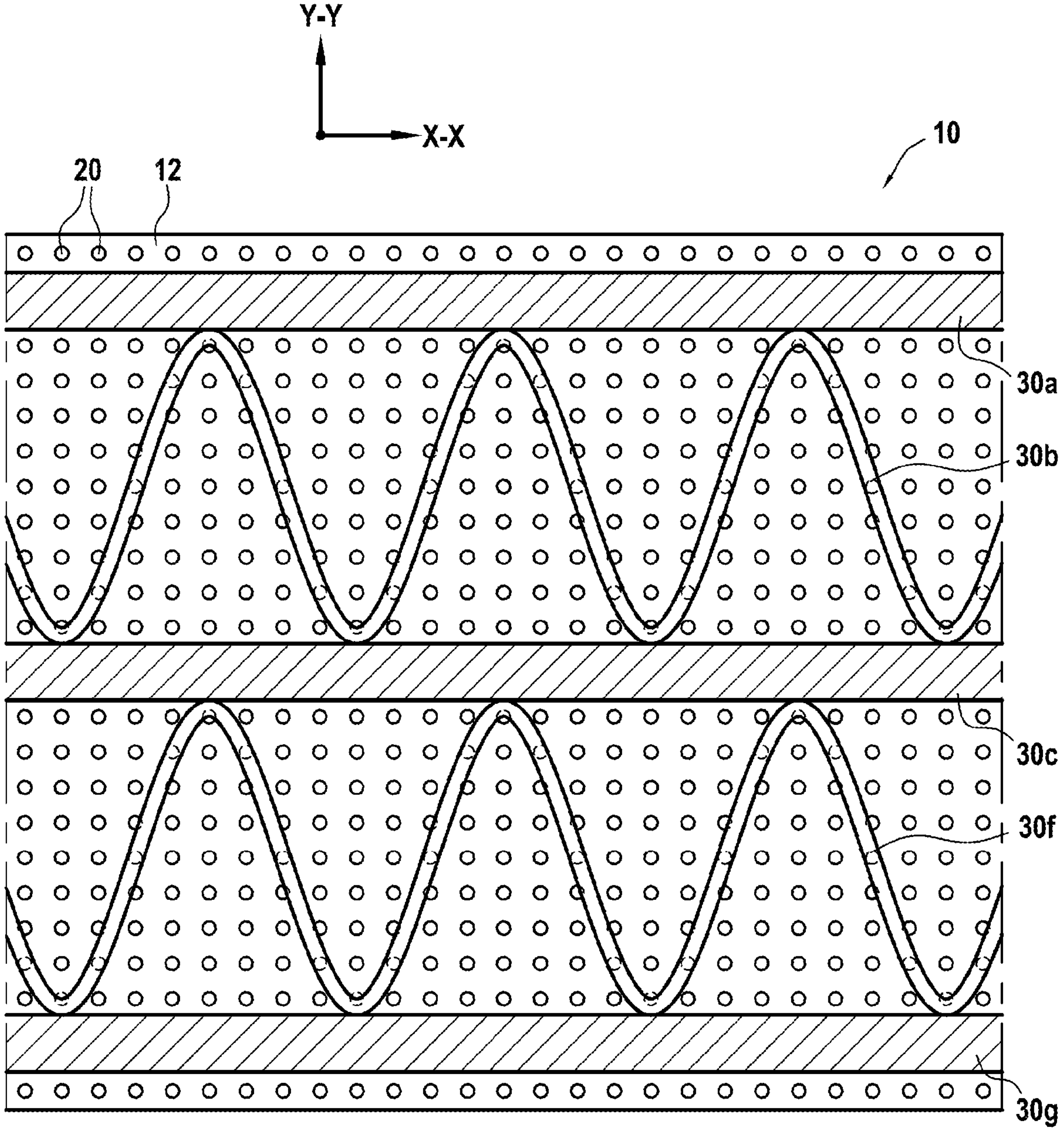
FIG. 6 schematically shows another example of a device according to one aspect of the invention.

FIG. 6 is a variant of the embodiment shown in FIG. 5, wherein the linear seams are thicker, the thickness here being designated in the sense of the dimension in the transverse direction, that is to say the direction in the plane of the tape 10 and perpendicular to the longitudinal direction.

Thus, this embodiment is similar to that already shown in FIG. 5, except that the linear seams 30*c* and 30*d* are here formed by a single seam 30*c* having a greater thickness. To separate this tape 10 into two separate products, cuts are then typically made in the longitudinal direction X-X in the middle of the thickness of the seams 30*a*, 30*c* and 30*g*.

Figure 7:
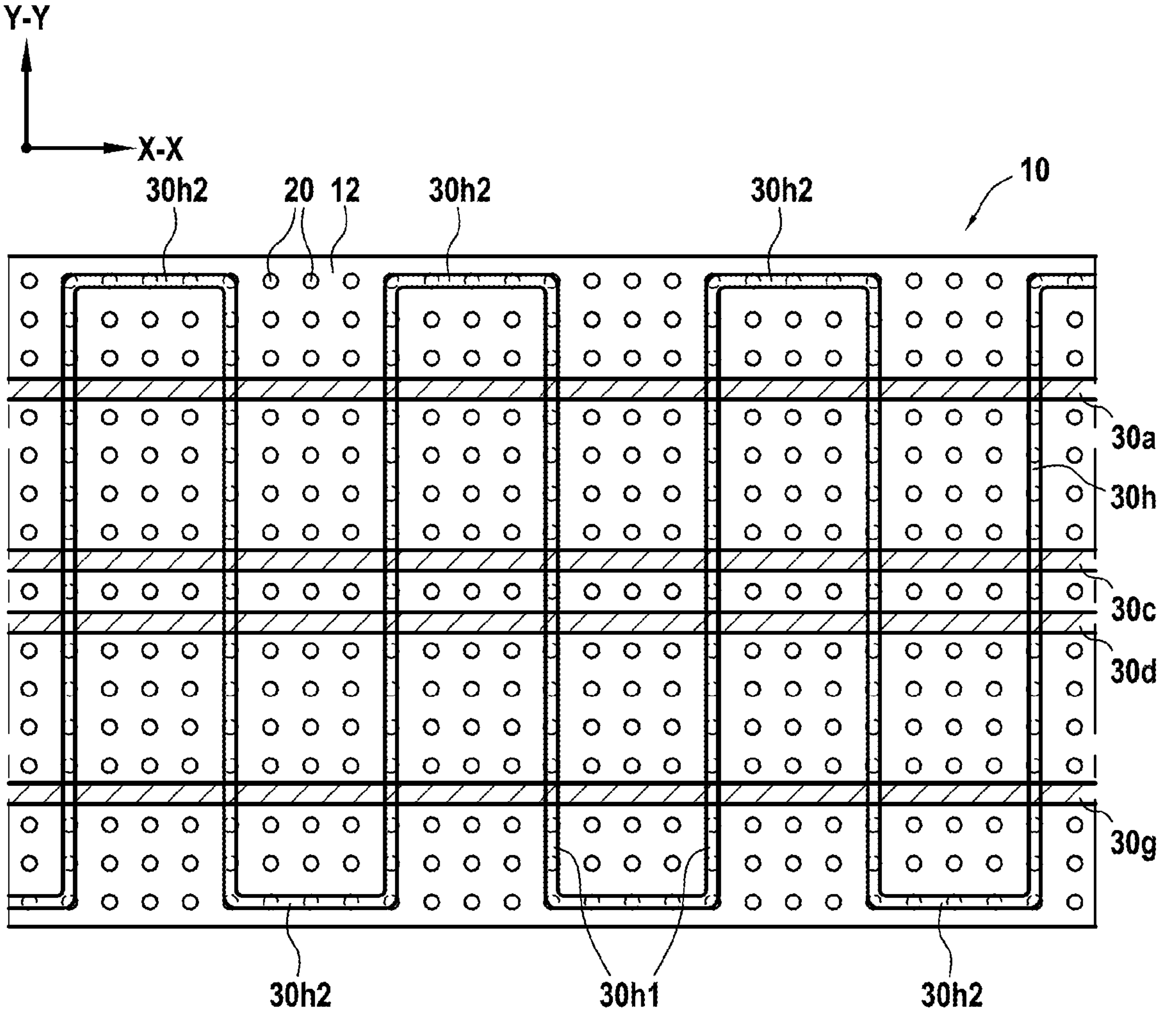
FIG. 7 schematically shows another example of a device according to one aspect of the invention.

FIG. 7 shows another variant of the embodiment shown in FIG. 5.

In this embodiment, there are linear seams 30*a*, 30*c*, 30*d* and 30*g*. However, there is here a single corrugated seam 30*h*, which has a pattern that can be regular or not, comprising transverse portions 30*h*1 which extend in the transverse direction Y-Y so as to overlap the various linear seams, and connecting portions 30*h*2 ensuring material continuity of the seam between the various transverse portions 30*h*1, said connecting portions 30*h*2 possibly being curved and/or comprising linear segments.

As for the embodiment already described with reference to FIG. 5, the tape 10 can here be cut along several cutting axes extending along the longitudinal direction X-X so as to obtain separate products. For each of these products, a tape is therefore obtained comprising two longitudinal seams and a plurality of transverse segments, which define with the longitudinal seams sectors of retaining elements which are protected during the injection of material on the tape.

Figure 8:
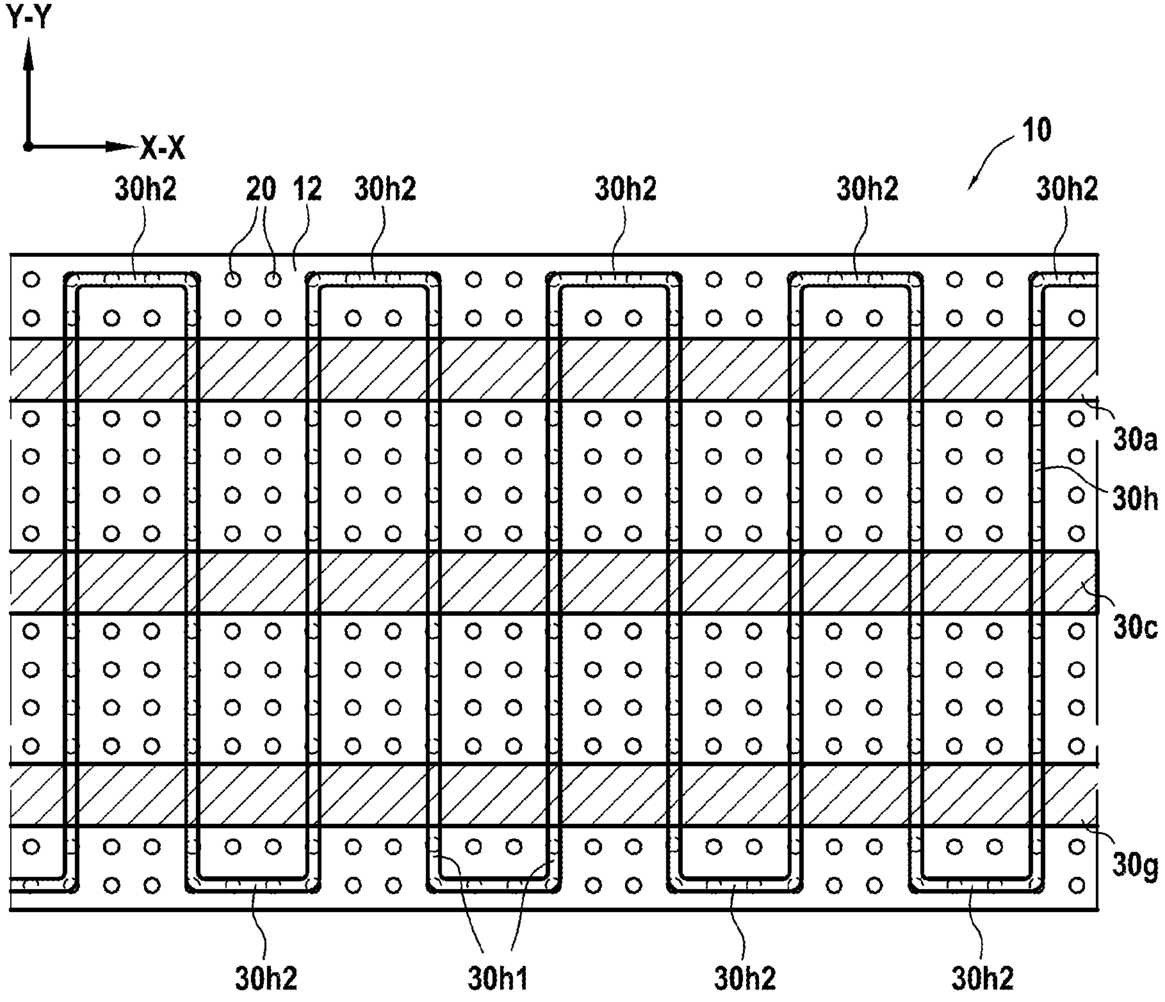
FIG. 8 schematically shows another example of a device according to one aspect of the invention.

FIG. 8 is a variant which combines the features of the embodiments shown in FIG. 6 and FIG. 7.

Therefore, it is possible to find here the linear seams 30*a*, 30*c* and 30*g* which are thicker than the linear seams shown in the example of FIG. 7, and the corrugated seam 30*h* which has transverse portions 30*h*1 overlapping these various linear seams.

The tape 10 can then be cut along several cutting axes extending along the longitudinal direction X-X typically in the middle of the thickness of the various longitudinal seams so as to obtain separate products. For each of these products, a tape is obtained comprising two longitudinal seams and a plurality of transverse segments, which define with the longitudinal seams sectors of retaining elements which are protected during the injection of material on the tape.

The various embodiments described previously can be made independently or in combination. It is for example possible to produce seams 30 arranged in pairs which have tangent portions and overlapping portions, alternately or not, regularly or not. It is also possible to integrate a metallic element such as a metallic rod 50 or a seam made of metallic material in an embodiment which comprises an overlap of all or part of the seams 30.

In the various embodiments shown in the preceding figures, it can be seen that the contours 40 are delimited by seams 30 forming a discontinuous deposition of material, in the sense that an interface is observed between the various seams of each pair of seams defining a contour 40.

Figure 9:
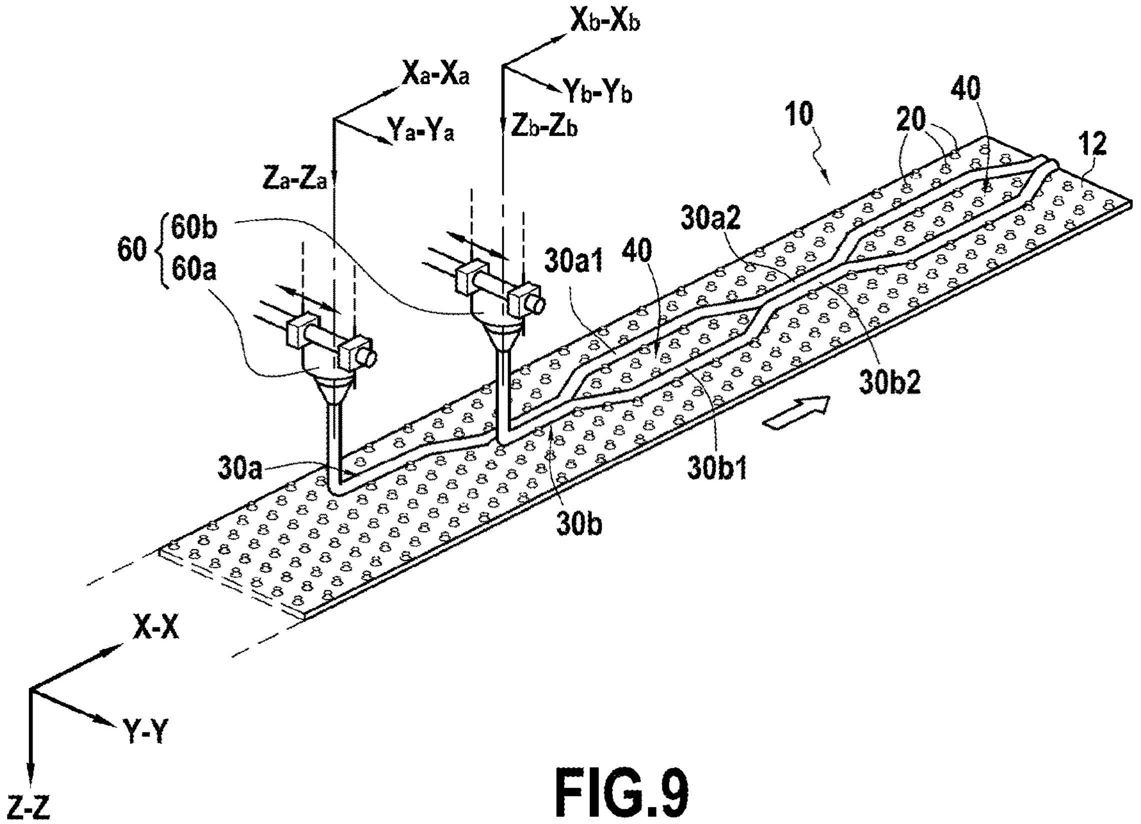
FIG. 9 schematically illustrates the embodiment of a device as proposed.

FIG. 9 schematically illustrates the embodiment of the devices as shown with reference to FIGS. 1 to 8.

In the example illustrated, the seams 30*a* and 30*b* are formed by material deposition via material deposition means 60 such as nozzles. In the example illustrated, there are two nozzles 60*a* and 60*b* movable in the transverse direction Y-Y.

The nozzles are disposed so as to be offset along the longitudinal direction X-X, so as to be able to move along the transverse direction Y-Y without contacting one another, in particular in the case of seams 30 which overlap.

The tape 10 is in turn positioned on a support, and is here moved in the longitudinal direction X-X, typically by drive means, for example a conveyor or one or more drive rollers (not shown in the figures).

As a variant embodiment, the support can be a roller, and the nozzles 60 can then be disposed on the periphery of the roller and be movable in translation along an axis parallel to the axis of the roller.

Alternatively, the tape 10 can be kept fixed, and it is then the material deposition means 60 which are movable in the longitudinal direction X-X and in the transverse direction Y-Y.

The method may also comprise a step of adjusting (calibrating) the thickness of the retaining device by means for adjusting the thickness of the retaining device to adjust the thickness of the retaining device at least upstream of the step of forming the at least one seam 30.

The method can also implement means for maintaining a constant thickness of the retaining device adapted to maintain a constant thickness of the retaining device before and during the step of forming the at least one seam 30. Optionally, the maintenance means are suitable for maintaining a constant thickness of the retaining device before the step of forming the at least one seam 30, and are arranged in the immediate vicinity of the means for forming the seam. Optionally, the maintenance means also maintain a constant thickness of the retaining device after the step of forming the at least one seam 30 over a distance of at least 10 cm. Optionally, the means for maintaining a constant thickness are arranged to apply a tension to the retaining device, at least during the step of forming the at least one seam 30, optionally before and/or after the step of forming the at least one seam 30.

According to one example, the means for adjusting and maintaining the retaining device comprise at least one roller upstream of the step of forming the at least one seam 30 and optionally at least one roller downstream of the step of forming the at least one seam 30.

The example illustrated shows a device for forming a pair of seams. However, it is understood that it can be generalized to an apparatus having multiple material deposition means 60 to form the desired number of seams 30, in particular depending on the total width of the tape.

In the case of a tape 10 comprising a metallic element, such as for example a metallic rod 50 or for example of the additional metallic seam, the metallic element can for example be associated with the tape prior to the deposition of material for the formation of the seams 30.

Figure 10A:
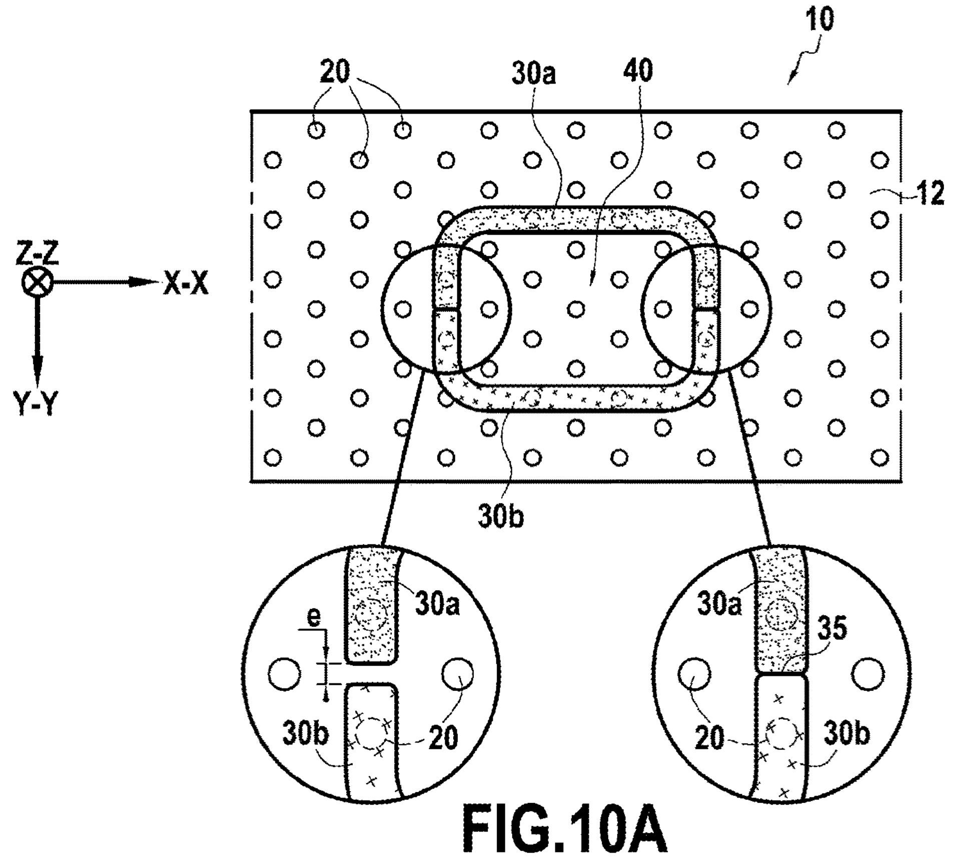
FIG. 10A schematically shows another example of a device according to one aspect of the invention.
Figure 10B:
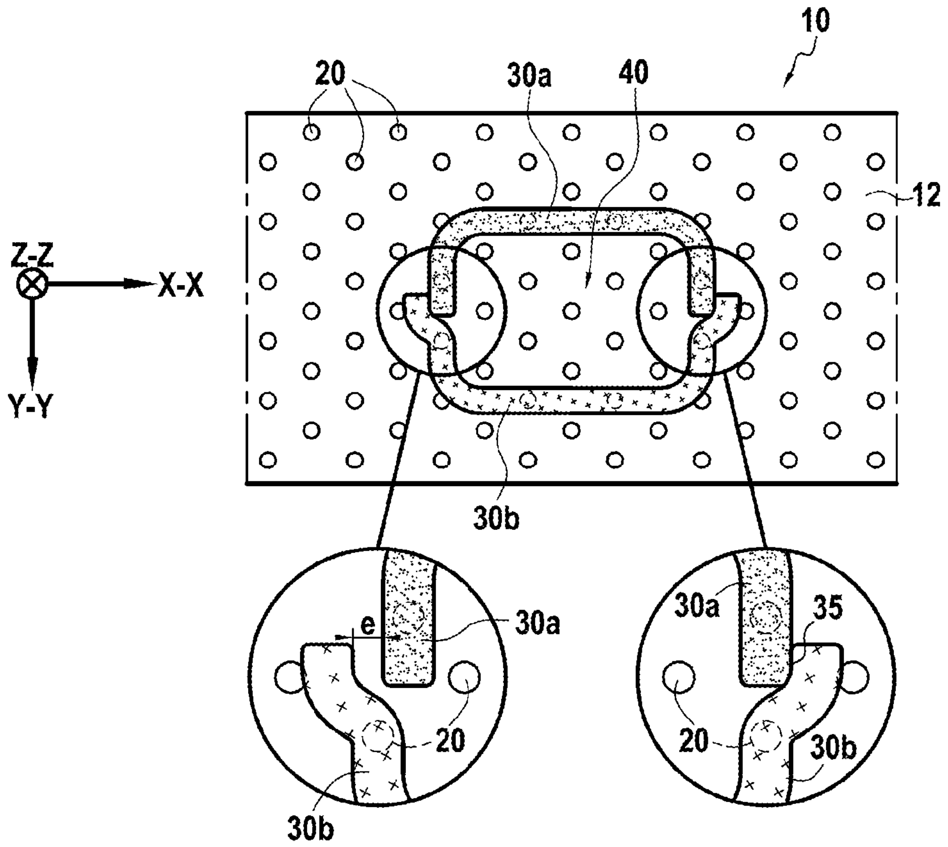
FIG. 10B shows a variant of FIG. 10A.

FIGS. 10A and 10B show two variants of another embodiment, wherein a contour 40 is produced, so as to form an element which is called a pellet or a "patch" according to the name commonly used in this field.

The contour 40 is here delimited by two seams 30*a* and 30*b*, the ends of which are associated in pairs so as to form a closed contour, as defined previously. Shown in each of these two figures is a pair of contiguous ends and a pair of non-contiguous ends.

As shown in this figure, it can be seen that the junctions of the seams 30*a* and 30*b* at their ends create a discontinuity of material 35, even in the case where the ends are contiguous. The contour thus created is called discontinuous. In the case where the ends are contiguous, the ends of the seams can join so as to contact one another (as schematically shown in FIG. 10A), so as to overlap in the vertical direction Z-Z, or so as to be tangent over a given distance (as schematically shown in FIG. 10B). In the event of overlapping of the ends, said ends typically overlap over a distance of at least 1 mm. The projection along the plane defined by the upper face 12 of the tape 10 of one of the ends is then typically superimposed on the projection along the plane defined by the upper face 12 of the tape 10 of the other end.

Such a contour 40 can for example be produced by keeping the tape 10 fixed and by moving the material deposition means 60 in the longitudinal direction X-X and in the longitudinal Y-Y, or in the case where the geometry of the contour 40 produced allows it, in the manner already described with reference to FIG. 5. Each of the seams 30*a* and 30*b* of the pair of seams 30 considered then typically has a profile having at all points a non-zero component in the direction of advance of the tape 10, namely the longitudinal direction if reference is made to the example shown in FIG. 9. In FIGS. 10A, 10B, 11A and 11B, the seam(s) is (are) arranged on retaining elements but in an alternative embodiment, this (or these) seam(s) could be arranged between two retaining elements.

Figure 11A:
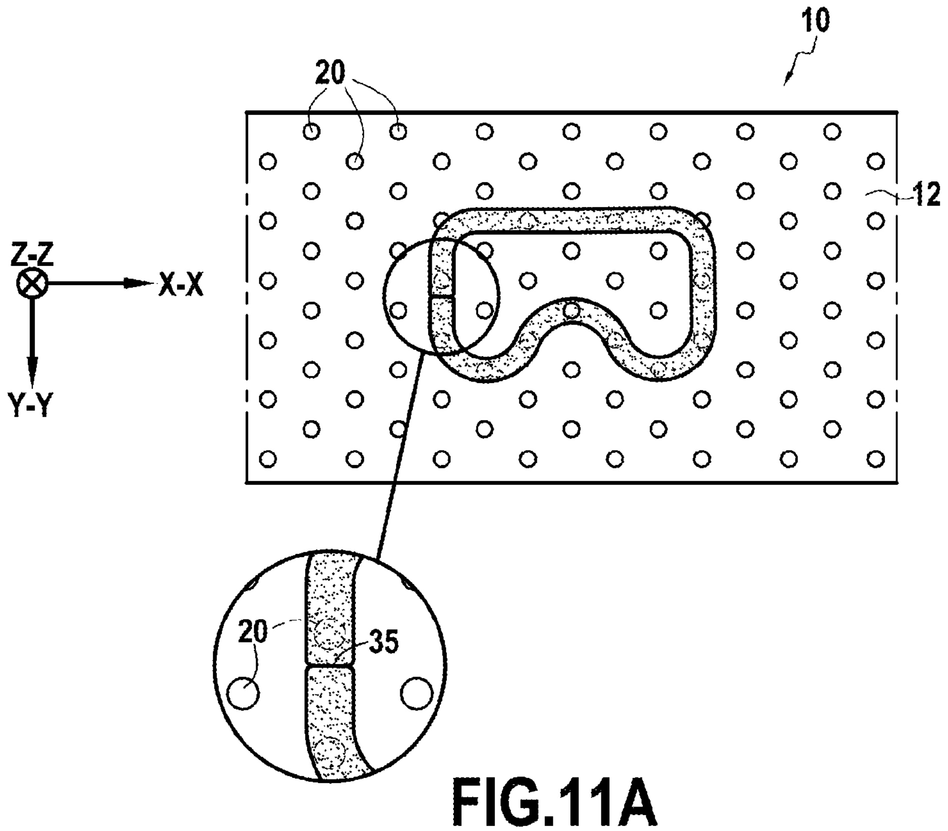
FIG. 11A schematically shows another example of a device according to one aspect of the invention.
Figure 11B:
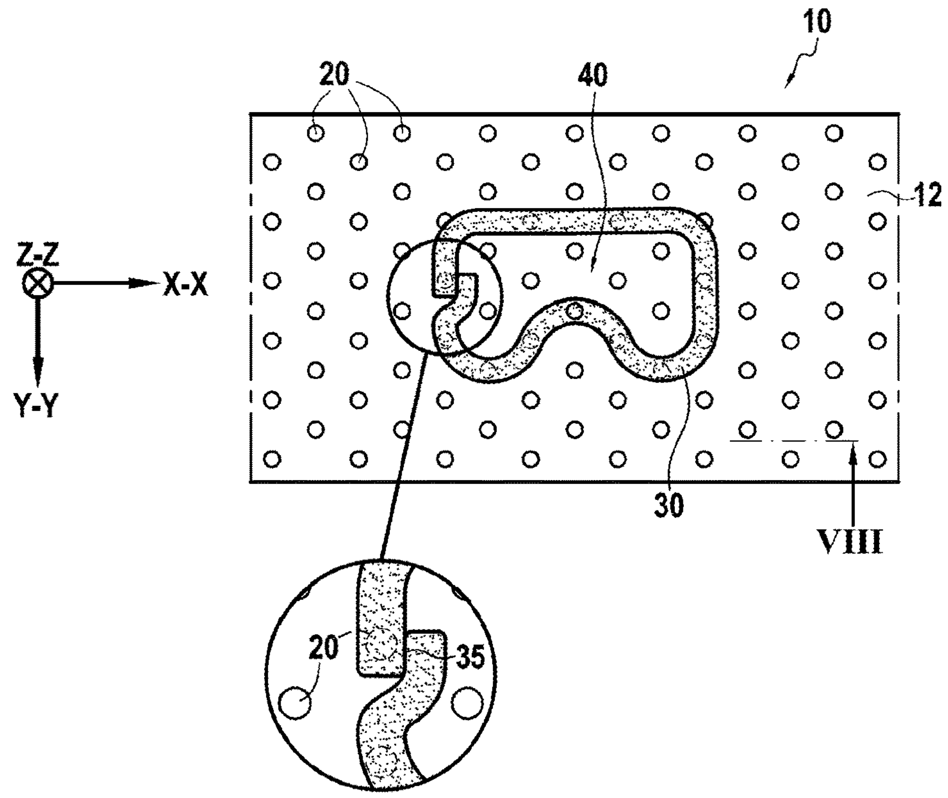
FIG. 11B shows a variant of FIG. 11A.

FIGS. 11A and 11B show variants of the embodiments already described with reference to FIGS. 11A and 11B. In these embodiments, the contour 40 is delimited by a single seam 30 of material, the two ends of which are contiguous. It is understood that the ends can also be non-contiguous, as already illustrated in particular with reference to FIGS. 10A and 10B.

As already described with reference to FIGS. 10A and 10B, a discontinuity of material 35 is observed at the junction between the two ends of the seam 30. The ends of the seam can join together so as to contact one another (FIG. 11A), so as to overlap in the vertical direction Z-Z, or so as to be tangent over a given distance (FIG. 11B).

For the production of such a contour 40 delimited by a single seam 30 of material, the material deposition is typically carried out via material deposition means 60 which are movable along two axes, for example along the longitudinal direction X-X and the transverse direction Y-Y while the tape 10 is held in position, although it can be moved for example for the successive production of different patterns on the same tape 10.

For the different shapes of pellets thus produced, the shape is typically symmetrical along a central axis.

In the various embodiments shown, the production of the seams 30 allows to produce an element forming a seal for injecting a material such as foam around the contour 40, thus preserving the retaining elements 20 in the contour 40 so that they remain functional.

The fineness of the seams 30 allows to reduce the width of the parts produced, which allows to improve the quality perceived in an assembled product such as a seat or a vehicle trim.

In the various embodiments, the seams 30 typically have a circular or semicircular, triangular, rectangular, hook-shaped, lip-shaped (for example single or multiple lip), stud-shaped section, or more generally any shape suitable for the production of a sealing element.

According to one example, the various seams 30 are subjected to a calendering step following their deposition on the upper face 12 of the tape 10, in particular so as to standardize their height.

In the various embodiments, the retaining elements are for example hooks having a rod and a head. The head typically has a maximum dimension in projection along a plane defined by the upper face 12 of the tape 10 comprised between 0.1 and 2 mm, or between 0.2 and 0.9 mm. The rod typically has a maximum dimension in projection along a plane defined by the upper face 12 of the tape 10 comprised between 0.1 and 0.8 mm, or between 0.1 and 0.6 mm.

The different shapes and geometries of the contours 40 thus produced are only shown by way of example, and are not limiting. It is indeed understood that the deposition of material for the production of the seams 30 allows to produce various shapes and patterns on the upper face 12 of the tape 10, in particular contours having symmetrical, asymmetrical or arbitrary shapes, repetitive or not, contiguous or separated to adapt to different seat shapes, in particular to so-called "surface type" seats, that is to say without visible seams.

The tape 10 comprises a base resulting from injection and/or extrusion which is formed integrally with the retaining elements. In a variant embodiment, the base is a woven fabric which comprises a ground yarn and a warp yarn interwoven with each other. In a variant embodiment, the base being a woven fabric comprising a ground yarn and a warp yarn interwoven with each other, the retaining elements are formed by yarns arranged at least partly in the base. More particularly, the yarns forming the retaining elements are monofilament yarns. The yarns forming the retaining elements are arranged in the base in the shape of a "V" and/or a "W".

The base and the retaining elements can be as described in one of the following patent applications: US2005268439 A1, EP0604869 A1, WO18007338 A1, WO17187096 A1 and WO11100999 A1.

The proposed structure thus allows to form a barrier that protects the retaining elements during the injection of material onto the tape 10. The proposed structure offers significant flexibility in terms of the geometry of the contours 40, and is more advantageous in terms of production than methods which aim at depositing a partial mask on the tape 10.

The proposed structure thus allows to produce a product using less material than the products of the prior art which use a solid and continuous cover in order to produce a tight barrier during the injection of foam. As indicated in the description, the applicant has indeed been able to observe that, surprisingly, it is not necessary to have an edge forming a perfect seal to prevent the penetration of foam into the internal surface of a considered contour and thus prevent the retaining elements present in this internal surface from being covered with foam.

In addition, the production of seams of material having two ends, joined or separated, significantly simplifies the production of the product while preserving the retaining elements. The invention allows in particular to dispense with the cutting steps required in the known methods, which considerably simplifies the manufacturing method, and reduces or even eliminates the waste generated.

Although the present invention has been described with reference to specific embodiments, it is obvious that modifications and changes can be made to these examples without departing from the general scope of the invention as defined by the claims. In particular, individual features of the different illustrated/mentioned embodiments can be combined in additional embodiments. Accordingly, the description and the drawings should be considered in an illustrative rather than restrictive sense.

It is also obvious that all the features described with reference to a method can be transposed, alone or in combination, to a device, and conversely, all the features described with reference to a device can be transposed, alone or in combination, to a method.

The invention claimed is:

1. A retaining device, comprising a tape having an upper face extending along a longitudinal direction, said upper face being provided with retaining elements, wherein the upper face of the tape comprises at least two seams of material defining a contour having an internal surface comprising some of the retaining elements, each of said at least two seams having two ends, said ends being associated in pairs, the distance between the ends of each pair of ends being less than or equal to 1 mm, said at least one seam of material being formed by depositing material on the upper face of the tape wherein said at least two seams of material are superimposed at least at one point in a vertical direction, perpendicular to the upper face of the tape.

2. The device according to claim 1, comprising a metallic element extending along the longitudinal direction, between said at least two seams.

3. The device according to claim 1, wherein the retaining elements are disposed in several columns extending along the longitudinal direction, and in that each of the at least two seams extends along a path having at all points a component along the longitudinal direction that is non-zero.

4. The device according to claim 1, wherein said at least two seams are tangent at least at one point.

5. The device according to claim 1, wherein each of said at least two seams has a width comprised between 0.5 mm and 10 mm.

6. The device according to claim 1, wherein at least one of said retaining elements has a maximum dimension “La” measured in a transverse direction perpendicular to the longitudinal direction and parallel to the upper face of the tape, and wherein each of said at least two seams has a width comprised between 0.2*La and 10*La.

7. The device according to claim 1, wherein said retaining elements have a height Ha measured in a vertical direction, perpendicular to the upper face of the tape, and wherein each of said at least two seams has a thickness measured in the vertical direction strictly greater than Ha.

8. The device according to claim 1, wherein said at least two seams is made of an elastomeric material.

9. The device according to claim 1, wherein each of said retaining elements arranged in the contour has a maximum dimension “La” measured in a transverse direction perpendicular to the longitudinal direction and parallel to the upper face of the tape, and wherein each of said at least two seams has a width comprised between 0.2*La and 10*La.

10. The device according to claim 1, wherein each of said retaining elements arranged in the contour has a maximum dimension “La” measured in a transverse direction perpendicular to the longitudinal direction and parallel to the upper face of the tape, and wherein each of said at least two seams has a width comprised between 0.5*La and 10*La.

11. A method for manufacturing the retaining device of claim 1 wherein: —provision is made of the tape having an upper face extending along the longitudinal direction, said upper face being provided with retaining elements, —the at least one seam two seams of material is formed on the upper face of the tape by deposition of material, so as to define the contour, each of said at least one seam two seams having two ends, said ends being associated in pairs, the distance between the ends of each pair of ends being less than or equal to 1 mm, wherein said at least two seams of material are superimposed at least at one point in the vertical direction, perpendicular to the upper face of the tape, forming the retaining device of claim 1.

12. The method according to claim 11, wherein the deposition of material is carried out by injection nozzles, depositing material on the upper face of the tape, said tape being moved in the longitudinal direction.

13. The method according to claim 11, wherein following the production of the seams of material, the tape is cut around each contour defined by the at least two seams of material.

14. A retaining device, comprising a tape having an upper face extending along a longitudinal direction, said upper face being provided with retaining elements, wherein the upper face of the tape comprises at least two seams of material defining a contour having an internal surface comprising some of the retaining elements, each of said at least two seams having two ends, said ends being associated in pairs, the distance between the ends of each pair of ends being less than or equal to 1 mm, said at least two seams of material being formed by depositing material on the upper face of the tape, wherein the upper face of the tape comprises at least two seams of material defining a contour, each of said at least two seams having two ends, said ends of said at least two seams being associated in pairs, the distance between the ends of each pair of ends being less than or equal to 1 mm and wherein said at least two seams are tangent at least at one point.

15. The device according to claim 14, comprising a metallic element extending along the longitudinal direction, between said at least two seams.

16. The device according to claim 14, wherein the retaining elements are disposed in several columns extending along the longitudinal direction, and in that each of the at least two seams extend along a path having at all points a component along the longitudinal direction that is non-zero.

17. The device according to claim 14, wherein said at least two seams are superimposed at least at one point in a vertical direction, perpendicular to the upper face of the tape.

18. The device according to claim 14, wherein each of said at least two seams have a width comprised between 0.5 mm and 10 mm.

* * * * *